United States Patent [19]

Oehler et al.

[11] Patent Number: 5,101,155
[45] Date of Patent: Mar. 31, 1992

[54] ROTATIONAL SPEED MEASUREMENT WITH FREQUENCY-DEPENDENT VOLTAGE COMPENSATION

[75] Inventors: Helmut Oehler, Oberursel; Uwe März, Schwalbach, both of Fed. Rep. of Germany

[73] Assignee: Fatec Fahrzeugtechnik GmbH, Alzenau, Fed. Rep. of Germany

[21] Appl. No.: 583,379

[22] Filed: Sep. 14, 1990

[30] Foreign Application Priority Data

Sep. 15, 1989 [DE] Fed. Rep. of Germany ...... 3930895

[51] Int. Cl.$^5$ ............................................. G01P 3/489
[52] U.S. Cl. .................................. 324/166; 324/160; 324/173
[58] Field of Search ............... 324/160, 166, 174, 173, 324/207.26, 207.15

[56] References Cited

U.S. PATENT DOCUMENTS 4,783,631 11/1988 Nakashima et al. ............ 324/160 X

Primary Examiner—Kenneth A. Wieder
Assistant Examiner—Warren S. Edmonds
Attorney, Agent, or Firm—Martin A. Farber

[57] ABSTRACT

A circuit for determining the speed of rotation of a wheel, has an inductive transmitter (1), the output of which is connected to a pulse-shaping device (7) whose output is connected to an evaluation device. The inductive transmitter is connected to an evaluation circuit (11) by means of a cable (6). The evaluation circuit is intended, on the one hand, to make certain that the input signal of the inductive transmitter (1) can be evaluated while, on the other hand, it should be able to detect errors which may occur, for instance due to a break in the cable (6) despite the presence of dirt resistances ($R_S$). For this purpose, an auxiliary circuit (10) is provided which varies the internal resistance of the pulse-shaping device (7) as a function of the speed.

8 Claims, 1 Drawing Sheet

ROTATIONAL SPEED MEASUREMENT WITH FREQUENCY-DEPENDENT VOLTAGE COMPENSATION

FIELD AND BACKGROUND OF THE INVENTION

The present invention relates to a circuit for determining the speed of rotation of a wheel, the circuit having an inductive transmitter the output of which is connected to a pulse-shaping device whose output is connected to an evaluation device.

In motor vehicles, it may be necessary, for instance for an anti-lock system, to detect the speed of a wheel or the speed of rotation of a wheel. For this purpose, inductive transmitters are used in which a sinusoidal voltage, the frequency of which is proportional to the speed of rotation of the wheel, is induced by a periodically varying magnetic conductance, for instance a toothed rim arranged concentrically to the wheel and turning in synchronism with the wheel. The approximately sinusoidal voltage is further processed by a subsequent electronic system which produces a train of square pulses from the voltage. From the distance apart in time of given variables of these square pulses, for instance the ascending flanks, information can be obtained as to the speed of rotation of the wheel in question by means of a digital processing device. Since the voltage produced in inductive transmitters is proportional to the change of the magnetic field with time, the output voltage of an inductive transmitter is strongly dependent on the frequency. The higher the frequency, the greater the amplitude of the output signal.

Since the inductive transmitters must be arranged directly on the wheel, they are subject to outside influences to an increased extent. They are dirtied by road dirt and moisture, and strongly acted on mechanically by vibrations. The vibrations can, for instance, change the distance of the transmitter from the toothed rim or lead to the breaking of an electric cable. The evaluation of the voltage produced by the inductive transmitter is generally not effected directly on the wheel but rather in a central evaluation device to which the voltage is transmitted by means of electric cables. The dirtying can result in so-called leakage-current paths between the two wires of a cable. The dirt resistances impair the diagnosis of errors which, in some manner, evaluates the voltage drop over the ohmic internal resistance of the inductive transmitter. This voltage drop is produced when a direct current is impressed upon the transmitter. The voltage drop reduces the sensitivity of the pulse-shaping circuit considerably if no decoupling of the DC potential on the sensor from that on the pulse-shaping device is effected.

SUMMARY OF THE INVENTION

The object of the present invention is to provide a circuit which, on the one hand, can respond with sufficient sensitivity even upon slow wheel speeds but, on the other hand, can still detect errors with sufficient accuracy.

This object is achieved in a circuit of the aforementioned type in the manner that an auxiliary device is provided which changes the internal resistance of the pulseshaping device as a function of the speed.

In this way it is possible to effect a verification of the arrangement for breaks in the cable at higher speeds, i.e. when the output signal of the inductive transmitter is of larger amplitude. The dirt resistances, which normally produce a closed current circuit and thus simulate an intact line, can then be recognized with a high degree of dependability. Conversely, upon a lower speed, i.e. when the amplitude of the output voltage of the inductive transmitter is lower, the internal resistance is changed and thus the sensitivity of the pulse-shaping device is increased. In such case, to be sure, no recognition of the dirt resistances is possible. However, such recognition need not be present continuously.

The auxiliary device advantageously evaluates the amplitude of an output voltage present at the output of the inductive transmitter. As stated at the start, the amplitude is a measure of the speed of rotation of the wheel. The higher the speed of rotation of the wheel, the greater the amplitude of the output voltage. Even if no linear relationship is present here, the evaluation of the value of the amplitude is sufficient to influence the internal resistance and thus the sensitivity of the pulse-shaping device sufficiently strongly.

The auxiliary device can also evaluate the frequency of the output voltage. The frequency is directly proportional to the speed. Particularly if frequency and voltage are evaluated together, conclusions can be drawn as to dirt resistances which may be present, as well as other disturbances, such as permanent changes in the air gap in the transmitter.

The auxiliary device advantageously varies an input resistance of the pulse-shaping device. The intervention in the input resistance of the pulse-shaping device is simplest at the input. The rest of the pulse-shaping device can then remain unchanged.

In one preferred embodiment, the pulse-shaping device has a comparator which is connected as a Schmitt trigger and the input resistance influences the height of the voltage present on the comparator.

In a preferred embodiment, the auxiliary device has a circuit element which, upon the exceeding of a predetermined speed of rotation of the wheel, connects a parallel resistor in parallel to the input resistance of the pulse-shaping device. In this way, a larger voltage drop is obtained over the internal ohmic resistance of the inductive transmitter. The voltage which is present on the comparator is thereby decreased. In this way it is possible, by connecting the parallel resistor, to check both the line to the inductive transmitter for breaks and also the correct functioning of the inductive transmitter, for instance the correct distance of the transmitter from the toothed rim.

The circuit element may advantageously be developed as a transistor. In this way, the entire circuit can be formed without mechanical elements.

In a preferred embodiment, the auxiliary device has a microprocessor. The microprocessor can be used at the same time to convert the pulses given off by the pulse-shaping device into the speed of rotation of the wheel. After information as to the speed of rotation of the wheel is available, the microprocessor can advantageously also be used for controlling the switch element of the auxiliary device.

BRIEF DESCRIPTION OF THE DRAWINGS

The invention will be described below with reference to a preferred embodiment, read in conjunction with the drawing, in which.

DETAILED DESCRIPTION OF THE PREFERRED EMBODIMENTS

Figure 1:
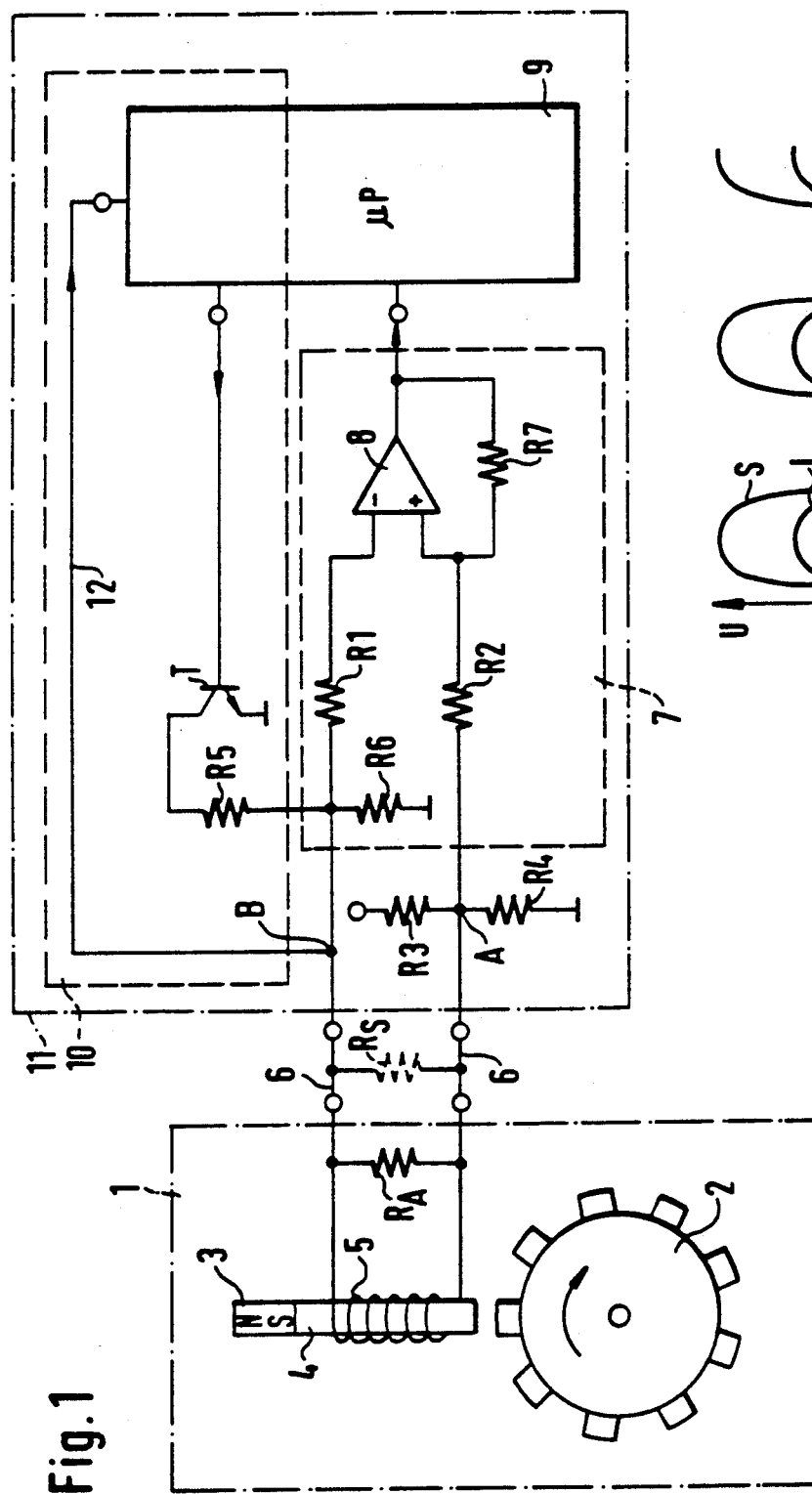
FIG. 1 is a circuit diagram.

A pulse transmitter 1 has a toothed rim 2 which moves past a core 4 connected to a magnet 3 when a wheel (not shown) rotates. Around the core 4 there is wound a coil 5. When the teeth of the toothed rim 2 move past the core 4, the magnetic conductance of the magnetic circuit changes and thus the magnetic flux produced by the magnet 3 in the core 4. The change in the magnetic flux induces in the coil a current which produces a voltage on a resistor $R_4$. This voltage is fed via a two-wire cable 6 to an evaluation device 11. Between the terminals of the line 6, so-called "dirt resistances" can result by the depositing of dirt on the surface, namely leakage current paths. Such a dirt resistance is shown in dashed line as resistance $R_S$. Such a dirt resistance $R_S$ makes it difficult for the evaluation device 11 to determine whether the line 6 has been broken or not. Even if the line 6 has a break, i.e. is electrically interrupted, a current can still be conducted from one wire to the other wire of the cable 6 via the resistor $R_S$.

The evaluation device 11 has a pulse-shaping device 7 which forms a train of pulses from the substantially sinusoidal output voltage of the inductive transmitter 1 which is fed via the line 6 to the evaluation device 11, the pulse train being fed to a microprocessor 9. The evaluation device 7 has a comparator 8 connected as Schmitt trigger. The non-inverting input of the comparator 8 is connected via a resistor R2 to a potential $P_A$ formed by a voltage divider R3/R4 at the point A. Furthermore, the non-inverting input of the comparator 8 is connected to the output of the comparator via a resistor R7. To the inverting input of the comparator 8 there is applied, via a resistor R1, a potential $P_B$ which changes substantially sinusoidally as a function of the voltage produced by the inductive transmitter 1 and a resistor R6 (see FIG. 2).

The potential $P_B$ is also fed via a line 12 to the microprocessor 9. The latter evaluates the voltage at the point B and therefore determines, for instance, the amplitude or the frequency of the voltage. Both variables provide information as to the speed of rotation of the toothed rim 2 and thus as to the speed of rotation of the wheel, which is to be determined. In order to be able to recognize a break in the line 6 in case of the presence of any dirt resistances $R_S$ on the terminals of the inductive transmitter, a resistor R5 is connected in parallel to the resistor R6 of higher ohmic value upon frequencies or amplitudes above a predetermined threshold value by means of an analog switch developed as transistor T. In this way, the internal resistance of the pulse-shaping device is decreased and its "sensitivity" reduced. The larger voltage drop over the internal ohmic resistance of the inductive transmitter 1 remains without effect on the output signal of the comparator 8 when the inductive transmitter 1 is otherwise functioning correctly, for example correct distance from the core 4 to the toothed rim 2, no short circuits or breaks. It is thus possible to reduce the "sensitivity" of the comparator by the switching in of the resistor R5.

Figure 2:
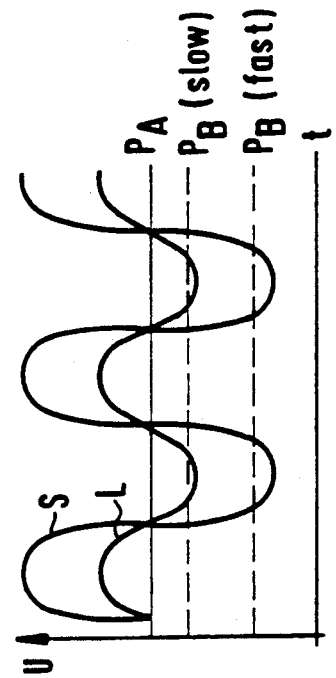
FIG. 2 is a graph of the voltage.

FIG. 2 shows two voltages produced by the inductive transmitter 1, namely, on the one hand, the voltage S which is produced upon rapid speed of the wheel, i.e. a high rpm, and the voltage L which is produced upon slow speed of the wheel, i.e. a lower rpm of the wheel. If the comparison voltage of the comparator 8 were left unchanged also at low speeds, the comparator would no longer produce pulses at low speeds of rotation. On the other hand, if the low comparison voltage were left constant also at high speeds of the wheel, there would no longer be any possibility of checking whether the inductive transmitter 1 is still operating correctly or is still connected at all.

We claim:

1. A circuit for determining the speed of rotation of a wheel, the circuit comprising
   an inductive transmitter, a pulse-shaping device, an evaluation device, and an auxiliary device; and
   wherein an output, in the form of a sequence of pulses, of the inductive transmitter is connected to the pulse-shaping device to activate the pulse-shaping device to produce a train of pulses;
   an output of the pulse-shaping device is connected to the evaluation device;
   the inductive transmitter outputs a voltage to the evaluation device;
   the evaluation device employs the voltage of the inductive transmitter to provide a measure of the speed of rotation, and to provide a drive signal to the auxiliary device representing the speed measure; and
   the auxiliary device, in response to the drive signal, changes an internal resistance of the pulse-shaping device as a function of the speed of rotation thereby to provide a substantially uniform sensitivity of the pulse-shaping device to the sequence of pulses of the inductive transmitter at both low and high speeds of rotation of the wheel.

2. A circuit according to claim 1, wherein
   the evaluation device evaluates the amplitude of an output voltage present at the output of the inductive transmitter.

3. A circuit according to claim 1, wherein
   the evaluation device evaluates the frequency of the output voltage of the inductive transmitter.

4. A circuit according to claim 1, wherein
   the internal resistance of the pulse-shaping device is provided by an input resistor.

5. A circuit according to claim 1, wherein
   the pulse-shaping device comprises a comparator and an input resistor connecting with an input terminal of the comparator;
   the comparator is connected as a Schmitt trigger; and
   the input resistor serves to establish a level of a voltage present at the comparator input terminal.

6. A circuit according to claim 5, wherein the auxiliary device comprises
   a second input resistor; and
   a switch element, responsive to the drive signal of the evaluation unit, upon an exceeding of a predetermined speed of rotation of the wheel, for connecting said second input resistor in parallel to said first-mentioned input resistor of the pulse-shaping device.

7. A circuit according to claim 6, wherein
   said switch element is a transistor connected in series with said second input resistor and ground.

8. A circuit according to claim 1, wherein
   said evaluation device comprises a microprocessor.

* * * * *